United States Patent [19]
Anderson

[11] 3,889,836
[45] June 17, 1975

[54] METHOD AND MEANS FOR CONSTRUCTING LARGE TANKS

[75] Inventor: Paul E. Anderson, Torrance, Calif.

[73] Assignee: Martin Marietta Aluminum, Inc., Torrance, Calif.

[22] Filed: Jan. 7, 1972

[21] Appl. No.: 216,005

[52] U.S. Cl................. 220/5 A; 220/80; 220/81 R
[51] Int. Cl..................... B65d 87/06; B65d 7/38
[58] Field of Search.................... 220/5 A, 80, 81 R

[56] References Cited
UNITED STATES PATENTS

| | | | |
|---|---|---|---|
| 784,128 | 3/1905 | Taylor | 138/154 |
| 1,496,585 | 6/1924 | Mangrum | 220/5 A |
| 1,966,244 | 7/1934 | Hansen | 220/5 A |
| 2,192,328 | 3/1940 | Price | 220/3 |
| 2,369,381 | 2/1945 | Unke | 220/80 |
| 2,685,964 | 8/1954 | Brown | 220/81 R |

*Primary Examiner*—George E. Lowrance
*Attorney, Agent, or Firm*—Millen, Raptes & White

[57] ABSTRACT

The invention relates to a method of constructing large stationary cylindrical tanks using novel means for butt-welding together the horizontal joints of the cylindrical side walls of the tank. The novel means are flexible connector seals adapted to fit between the joints, and flexible portions of the seals are welded to the adjacent inner vertical surfaces of the side walls. Flexible connector seals are also provided for welding the bottom perimeter of the tank to the bottom edge of the cylindrical side wall.

3 Claims, 7 Drawing Figures

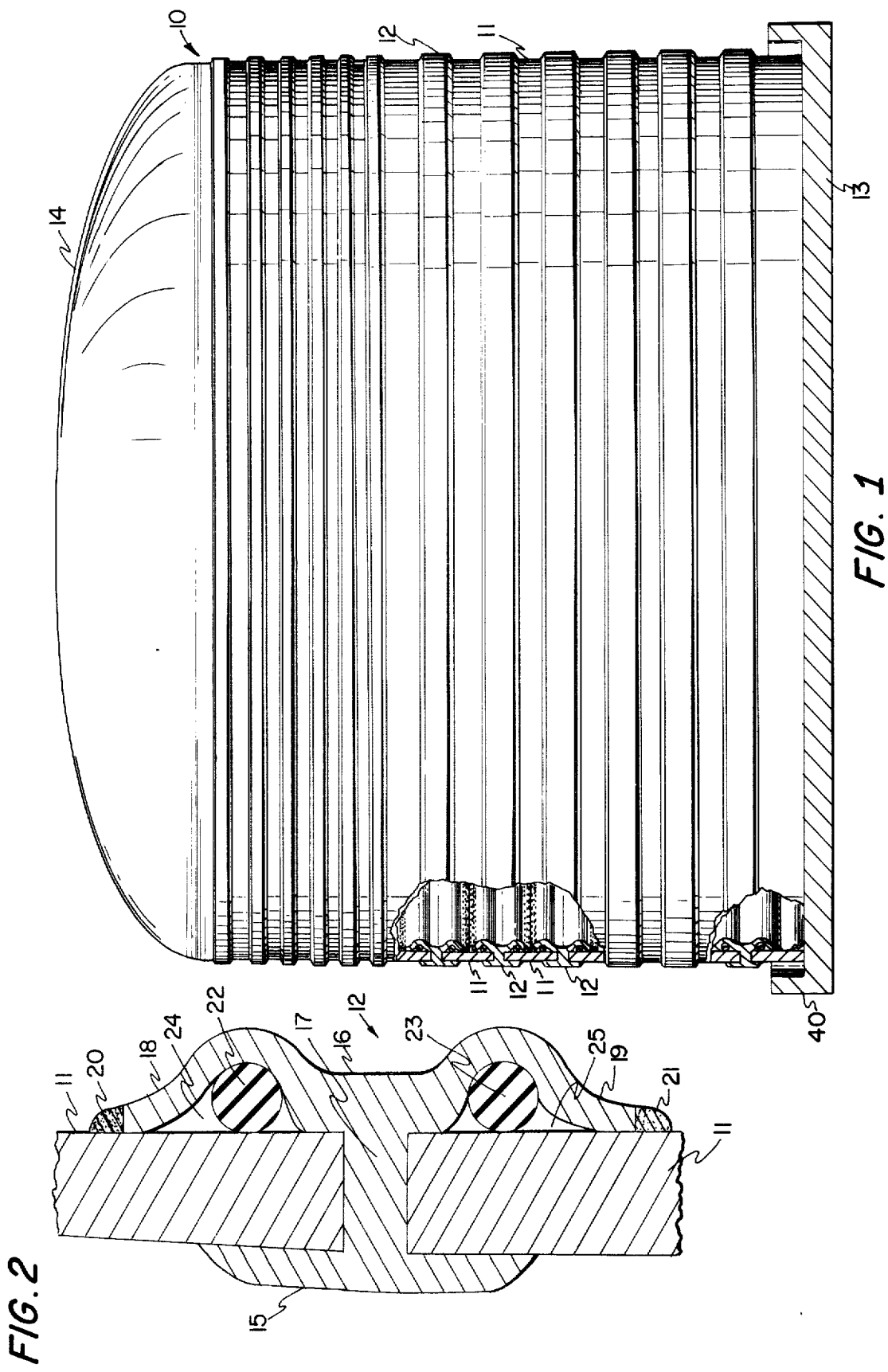

METHOD AND MEANS FOR CONSTRUCTING LARGE TANKS

The present invention relates to a method for the manufacture of stationary cylindrical containers, particularly large cryogenic tanks, which are intended to be subjected, in operation, to large internal pressures.

Generally, large cylindrical tanks of either steel or aluminum are manufactured with a flat bottom plate. Where the tank is not unusually large in diameter, the bottom is butt-welded to the plates of the cylindrical shell. In larger tanks, in order to obtain greater strength in the bottom, plates are joined together by overlapping welding or butt-welding against underlying strips. In constructing tanks of significant height, several shells are required for the build-up of the height and are butt-welded together around the circumference.

Many disadvantages of known methods of tank construction arise in the fact that the various welds, and particularly butt-welds, can develop cracks, etc. from thermal and shifting stresses. Thus, because the weld is relatively weak in relation to the material in the tank structure, any type of shifting can produce stresses and can cause deleterious cracks in the welds.

Furthermore, in constructing tanks from aluminum, a high degree of skill is required to obtain 100 percent penetration welds. Aluminum design requirements for tanks specify 50 to 100 percent greater thicknesses than for steel and this normally doubles the number of passes needed to produce 100 percent penetration welds. The excessive heating required to produce thick welds can reduce the strength of the base metal and this contributes along with the other factors to the possibility of causing cracks in the welds.

This invention provides a method for the construction of stationary cylindrical tanks which eliminates the disadvantages encountered in known construction methods. According to the invention, the disadvantages are overcome by the use of a novel means for butt-welding together the horizontal joints of the tank and in joining together the side walls and bottom. The novel means comprise flexible connector seals adapted to fit between the joints of abutting horizontal ends of the shells of the tanks. The seals have a generally H-shaped cross section and flexible portions of the seals are welded to adjacent inner vertical surfaces of the shells. The invention also provides flexible connector seals to be used in welding the bottom of the tank to the bottom edge of the cylindrical shell.

The novelty and advantages of the invention will become apparent from a description of specific embodiments thereof which are not intended to be limiting in any sense. The invention will now be described more closely with reference to the drawings in which:

FIG. 1 shows a side elevational view of a cylindrical tank manufactured according to the invention, with portions thereof broken away to disclose construction details;

FIG. 2 is an enlarged cross-sectional view of a horizontal joint between two shells of the tank joined together with a novel flexible connector seal of the invention;

Figure 3:
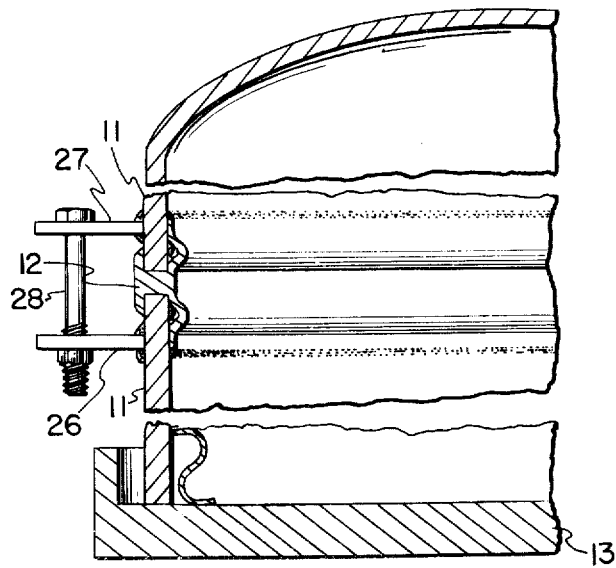
FIG. 3 shows an upper position of the tank wherein a restraining bolt and bracket, optionally, can be used to hold the dome from being lifted up due to internal pressure.

Referring now to the drawings, the numeral 10 denotes a large cylindrical tank constructed in accordance with this invention. The tank comprises a plurality of cylindrical side walls or shells 11 with the joints held together by the novel flexible connector seals 12 of this invention. In FIG. 1, the connector seals are shown exaggerated and are out of proportion to their actual size of the tank. The tank also comprises a bottom or foundation 13 and a dome 14.

As shown in FIG. 2, the connector seals 12 has a generally H-shaped cross-section and can be of varying lengths. The seal comprises an outer sleeve section 15, an inner sleeve section 16, and a neck section 17. Section 16 comprises flexible legs 18 and 19.

Seals 12 are placed between the joints of adjacent cylindrical side walls or shells 11 as the tank is being constructed from the bottom. The legs 18 and 19 of the connector seal are positioned against the inner wall of shells 11 and welded along the wall at 20 and 21. The connectors can be of a suitable, manageable length whereby a series of abutting connectors are used around the circumference of the tank to join adjacent shells 11. At the point of abutment of the connectors to each other, a weld is applied vertically along the seam formed by sleeve 16, and legs 18 and 19.

Optionally, O-rings 22 and 23, or a caulking compound, can be disposed within the pockets or voids 24 and 25 formed by the legs 18 and 19, thus providing additional sealing characteristics to the joint.

FIG. 3 shows a restraining bolt and bracket which may be used with the upper shells near the dome to prevent them from being lifted up due to internal pressure. The bracket arms 26 and 27 are welded to the outer walls of adjacent shells 11 containing a connector 12 at the joint. Bolts 28 are secured between the bracket arms. Restraining bolts and brackets can be positioned intermittently around the circumference at intervals of about 6 feet as needed by the design requirements of the tank. The restraining bolts and brackets merely reinforce the joint and are not necessary to the function of the connector 12.

Figure 4:
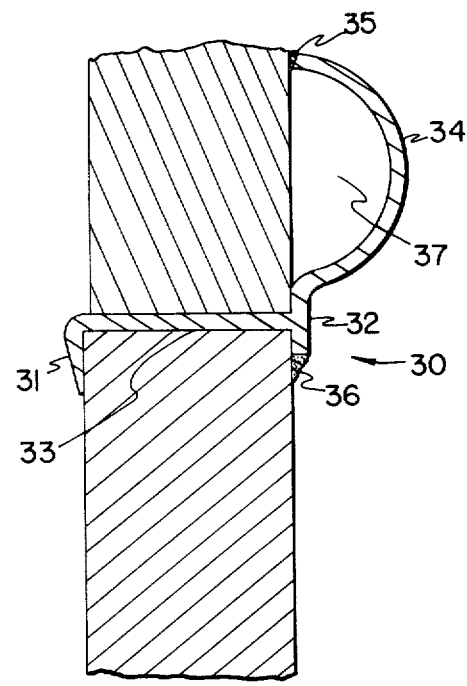
FIG. 4 shows a modified type of connector seal particularly usable at the first joint near the bottom.

FIG. 4 shows a modified type of connector seal 30 particularly adapted to be used at the joints between the lower shells of the tank. The connector comprises outer and inner sleeve sections 31 and 32 with a neck section 33. A flexible leg 34 is adapted to be welded at 35 and sleeve 32 to be welded at 36. Again, optionally, pocket 37 may contain an O-ring, caulking compound or the like.

Figure 5:
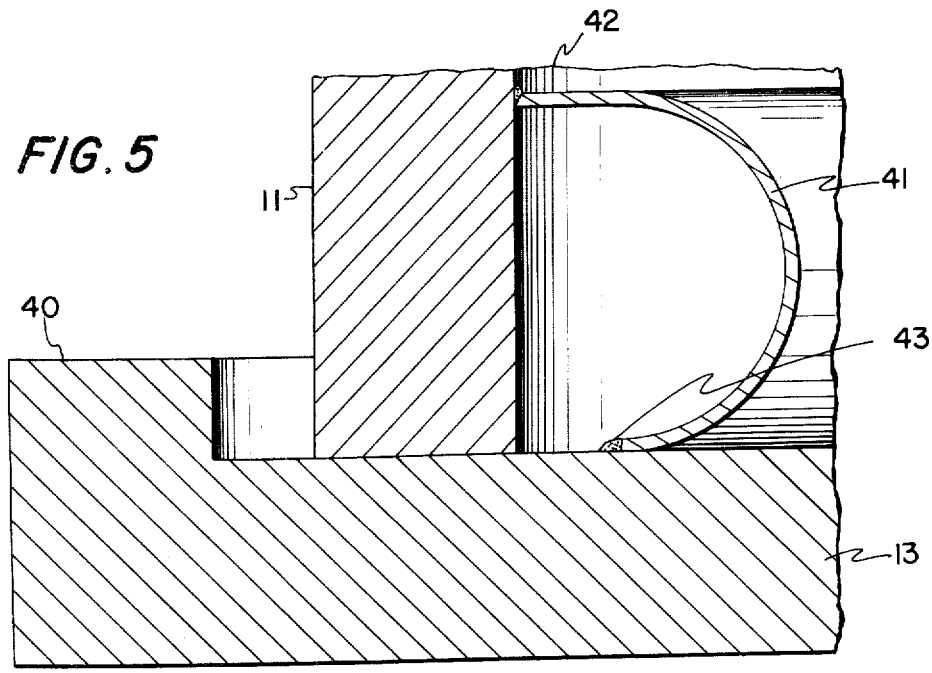
FIGS. 5, 6 and 7 show several types of flexible connector seals usable between the bottom and the shell of the tank.
Figure 6:
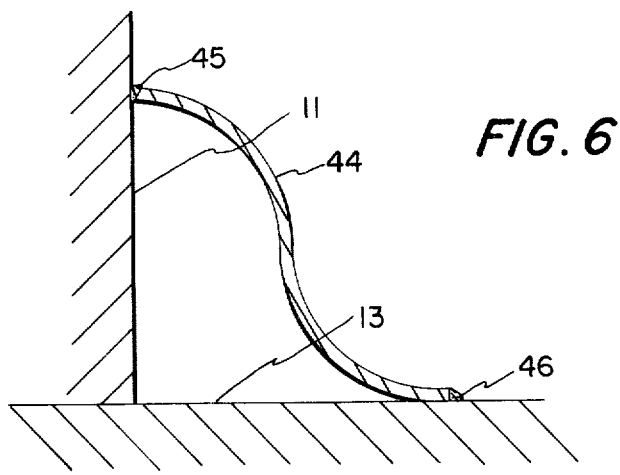
Figure 7:
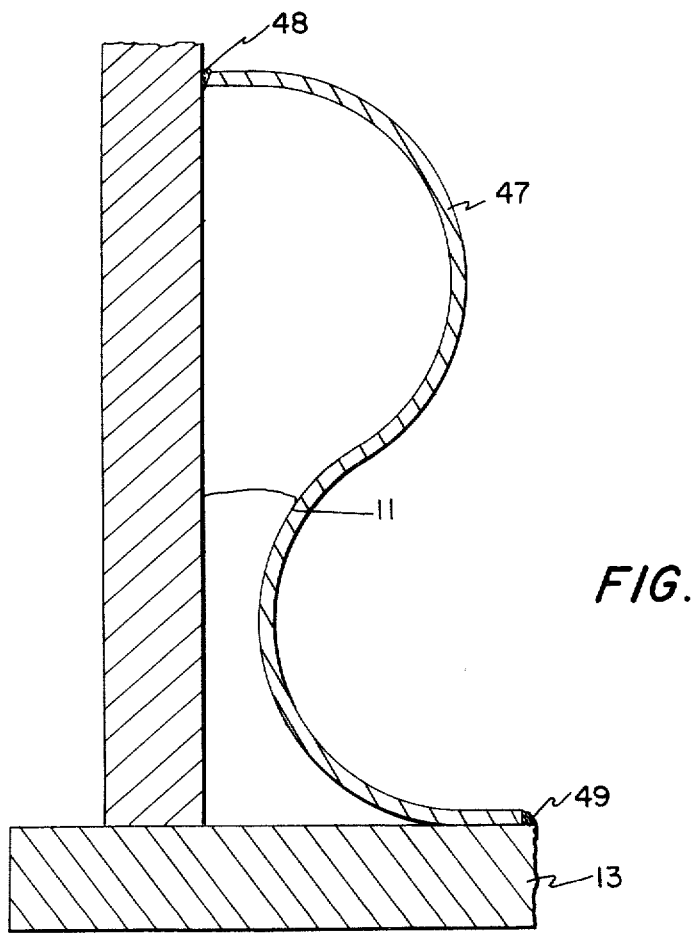

FIGS. 5, 6 and 7 depict three flexible connector seals usable between the bottom 13 and the first shell 11 of the tank. Large tank construction normally provides for a safety stop 40 around the perimeter of the bottom. Outward movement of the tank shell, caused by various factors, is restrained by said stop. The connector seals depicted, being flexible, permit such movement without producing high stresses in the seal welds between the first shell and the bottom.

In FIG. 5, the connector seal 41 has the cross-sectional shape of a semicircle welded at 42 and 43.

In FIG. 6, the connector seal 44 has a cross-sectional S-shape welded at 45 and 46.

In FIG. 7, the connector seal 47, welded at 48 and 49, also has a cross-sectional S-shape but permits greater movement of shell 11.

The flexible connector seals of the invention are made of the same material from which the tank components are made, i.e., steel or aluminum or any other material of construction.

The seals, although subject to minor stresses, are unaffected by direct forces of compression, expansion, etc. since the welds are not located in the load carrying primary structural members.

By the use of the connector seals in the construction of tanks, the welding required with the horizontal joints between adjacent shells is materially reduced and simplified. Thus, a pair of simple low-cost single pass seal welds is all that is required. By this procedure, erection problems are reduced, there is an elimination or significant reduction in the loss of strength in the base metal from that which results with conventional butt-welding procedures. In addition, the connector seals permit design features in tank construction which will allow greater flexing between adjacent shells without overstressing the seal welds.

Overall, the tank construction procedures herein reduce cost and time required for field assembly of large tanks. Pre-fabrication of tank portions is possible thereby reducing the welding required at the construction site. The connector seals are also adaptable to the use of known explosive welding techniques which can also reduce construction costs.

The procedures of this invention permit construction of tanks of any desired practical size, e.g., tanks as large as 300 feet in diameter and as high as 200 feet. Generally, depending on the design requirements, the lower shells of large tanks are about 2 inches and the upper shells ½ inch in thickness. The shells are generally about 10 feet wide. The connector seals are designed to be of minimum thickness and those shown herein are merely exemplary of various shapes and configurations possible.

Although various flexible connector seals have been shown, other designs or configurations are within the scope of the invention. Thus, the seals can be designed to accomodate the joining of abutting shells which have different thicknesses as is the case where design requirements of tanks specify progressively thinner shells to the top of the tank.

What is claimed is:

1. A stationary tank comprising a cylindrical vertical wall, a bottom, and a dome, said cylindrical wall comprising a plurality of vertical cylindrical shells comprising horizontal joints between the top and bottom edges of adjacent shells, strips of connector seal means within said joints, said seal means comprising a metal strip having in cross-section outer and inner sleeve means with neck means therebetween, said neck means disposed between said top and bottom edges of adjacent shells, said inner sleeve means comprising upper and lower leg means wherein the end of each leg means is welded circumferentially to respective inner walls of said adjacent shells, at least one of said leg means being flexible and curved thereby defining a pocket between said curved leg means and a said inner wall, and a sealing material disposed within said pocket.

2. The stationary tank of claim 1 wherein an O-ring is disposed in said pocket.

3. The stationary tank of claim 1 wherein a caulking compound is disposed in said pocket.

* * * * *